(12) United States Patent
Kempf

(10) Patent No.: US 11,281,591 B2
(45) Date of Patent: Mar. 22, 2022

(54) METHOD FOR IMPLEMENTING A VIRTUAL ADDRESS SPACE ON AN EMBEDDED SYSTEM

(71) Applicant: Endress+Hauser Conducta GmbH+Co. KG, Gerlingen (DE)

(72) Inventor: Stefan Kempf, Kornwestheim (DE)

(73) Assignee: Endress+Hauser Conducta GmbH+Co. KG, Gerlingen (DE)

(*) Notice: Subject to any disclaimer, the term of this patent is extended or adjusted under 35 U.S.C. 154(b) by 13 days.

(21) Appl. No.: 16/716,619

(22) Filed: Dec. 17, 2019

(65) Prior Publication Data
US 2020/0192808 A1 Jun. 18, 2020

(30) Foreign Application Priority Data
Dec. 17, 2018 (DE) ...................... 10 2018 132 385.9

(51) Int. Cl.
*G06F 12/0873* (2016.01)
*G06F 12/109* (2016.01)
*G06F 8/30* (2018.01)
*G06F 12/06* (2006.01)

(52) U.S. Cl.
CPC ............ *G06F 12/0873* (2013.01); *G06F 8/30* (2013.01); *G06F 12/0653* (2013.01); *G06F 12/109* (2013.01); *G06F 2212/7201* (2013.01)

(58) Field of Classification Search
CPC ............... G06F 12/023; G06F 12/0292; G06F 12/0653; G06F 12/0873; G06F 12/109; G06F 2212/7201
See application file for complete search history.

(56) References Cited

U.S. PATENT DOCUMENTS

| | | | |
|---|---|---|---|
| 2007/0283125 A1* | 12/2007 | Manczak | G06F 11/3466 711/207 |
| 2009/0210649 A1* | 8/2009 | Wan | G06F 12/109 711/170 |
| 2017/0126738 A1 | 5/2017 | Wilkerson et al. | |

\* cited by examiner

*Primary Examiner* — Aracelis Ruiz
(74) *Attorney, Agent, or Firm* — Kelly J. Smith; Endress+Hauser (USA) Holding Inc.

(57) ABSTRACT

The present disclosure includes a method for implementing a virtual address space. The method includes providing an embedded system having a physical memory defining a physical address space. The method includes providing a program, executable by the embedded system, having a program range having an access characteristic and a memory layout for the virtual address space. The program range is assigned to a virtual address in the virtual address space and has a program size. The method further includes creating the virtual address space on the embedded system, which comprises segments having an identical segment size and a separate virtual start address. The method also includes creating a conversion table on the embedded system for converting a virtual address of the program range into a physical address in the physical memory. Finally, the method converts a memory access to the virtual address into the physical address using the conversion table.

9 Claims, 6 Drawing Sheets

```
Q
 ↘    void Print(const char *s) {
           puts(s);
      } int main(int argc, char **argv) {
          for (int i = 0; i < argc; i++)
              Print(argv[i]);
          return 0;
      }
```

| 0x60000000 | 0x40000000 | 0x20000000 | 0x00000000 |
|---|---|---|---|
| S3 | S2 | S1 | S0 |
| S7 | S6 | S5 | S4 |
| 0xe0000000 | 0xc0000000 | 0xa0000000 | 0x80000000 |

```
L   MEMORY {                                                    G1
        /* Place code and read-only data in segment 2 */
        ROM (rx) : ORIGIN = 0x40000000, LENGTH = 512M /* Place readable and writable data in segment 4*/
        RAM (wai) : ORIGIN = 0x80000000, LENGTH = 512M
    }
    ... // Further linker script instructions
```

| S  | HA0     | L1    | L2    | L4    | Z1 |
|----|---------|-------|-------|-------|----|
| S0 | null    | 0     | 0     | 0     | -  |
| S1 | null    | 0     | 0     | 0     | -  |
| S2 | 0x41000 | 0xb94 | 0xb93 | 0xb91 | rx |
| S3 | null    | 0     | 0     | 0     | -  |
| S4 | 0x1234  | 0x464 | 0x463 | 0x461 | rw |
| S5 | null    | 0     | 0     | 0     | -  |
| S6 | null    | 0     | 0     | 0     | -  |
| S7 | null    | 0     | 0     | 0     | -  |

METHOD FOR IMPLEMENTING A VIRTUAL ADDRESS SPACE ON AN EMBEDDED SYSTEM

CROSS-REFERENCE TO RELATED APPLICATION

The present application is related to and claims the priority benefit of German Patent Application No. 10 2018 132 385.9, filed on Dec. 17, 2018, the entire contents of which are incorporated herein by reference.

TECHNICAL FIELD

The present disclosure relates to a method for implementing virtual address spaces on an embedded system.

BACKGROUND

Nowadays, embedded systems are indispensable to industry. They are increasingly being used, such as in process analysis. An embedded system is normally tailored to a specific technical context in which it takes over a specific task, usually regulation or control. Embedded systems operate in an optimized and secure manner due to this individual design. Embedded systems thus meet the ever increasing requirements in terms of efficiency and freedom from error in process analysis.

However, embedded systems which are tailored to a particular task often have a static firmware whose components run in a single address space. Software errors in one component, such as memory overwrites, can thereby also affect the remaining components, for example by corrupting data or causing the entire system to crash. Moreover, should there be a change to the task of the embedded system during the course of the operating life of the embedded system, a static firmware running within an address space hinders a subsequent introduction of new functionality.

Virtual address spaces are well suited to imparting more flexibility to the functionality of an embedded system, and to isolating faults in the individual components from one another. For example, by implementing virtual address spaces on an embedded system, different programs may be executed concurrently. In this instance, each program is executed in isolation from other programs so that one program cannot manipulate a second program or access a memory range of the second program. A further advantage of virtual address spaces is that code and data of the executed program are stored fragmented in a physical main memory of the embedded system, but can be blended unfragmented in the virtual address space. This facilitates a subsequent reloading of functionality. Since each program has its own linear address space, a program must, at its time of creation and at runtime, know nothing about its placement within the physical main memory of the specific embedded system on which the program is executed.

To implement a virtual address space on an embedded system, a mapping rule is needed that indicates how a virtual address in the virtual address space is mapped to a physical address in the physical main memory of the embedded system. If a program accesses a virtual address, said address must be converted into a physical address. This conversion is usually executed by special hardware, what is known as the memory management unit, also called the MMU, which resides in the main processor of the embedded system. For this conversion, the MMU requires a high level of power and/or computing resources compared to the remaining components of the embedded system.

There are embedded systems which operate with severely limited resources, for example in order to save manufacturing costs or because only a limited energy budget is available. Since an MMU is a complex hardware unit, embedded systems with severely limited resources often do not have an MMU. Therefore, the implementation of virtual address spaces in such fields of application is dispensed with.

SUMMARY

Therefore, it is an object of the present disclosure to propose a method for the resource-efficient implementation of virtual address spaces on an embedded system which manages without hardware support for address conversion.

This object is achieved according to a method of the present disclosure. The method for implementing a virtual address space comprises steps of: providing an embedded system having a physical memory, a loader, and an execution unit, where the physical memory defines a physical address space; and providing a program, where the program is executable by the embedded system, having at least one program range having a respective access characteristic, and having a predetermined memory layer for the virtual address space, where the at least one program range is assigned to a virtual address in the virtual address space and has a program size.

The method also includes the creation, by the loader, of the virtual address space on the embedded system, which virtual address space comprises at least two segments having a respective identical segment size and a respective separate virtual start address, thereof a first segment and a second segment. Next, the method includes a step of creating, by the loader, a conversion table on the embedded system for the program, for converting a virtual address of the at least one program range into a physical address in the physical memory. Finally, the method includes the conversion of a memory access to the virtual address into the physical address using the conversion table, by the execution unit or the program.

The method according to the present disclosure makes it possible to implement virtual address spaces even in embedded systems with limited resources.

An advantage of the method according to the present disclosure is that the method can be implemented efficiently in software via limitations in the construction of the virtual address space and via the selected data structure for converting virtual addresses into physical addresses. The method is designed such that a conversion of a virtual address into a physical address can be performed with uniform effort and a small number of instructions. Thus, no MMU is needed.

According to one embodiment of the present disclosure, the memory layout is constructed such that program ranges having different access characteristics are written to different segments: such that a segment is always filled starting from its virtual start address; such that the first segment is never mapped to the physical address space; and such that the at least one program range is allowed to extend over a plurality of segments if the program size exceeds the segment size and program ranges having different access characteristics are simultaneously written to different segments, and a segment is filled starting from its virtual start address.

According to another embodiment of the present disclosure, the virtual address space is divided into a number of segments, wherein the number is a power of two.

The method according to the present disclosure is adapted for generating a program for an embedded system. The program is based on a source code and a memory configuration such that the program has a predetermined memory layout. The program is executable by the embedded system and has at least one program range. The at least one program range is assigned to a virtual address in the virtual address space and has an access characteristic and a program size.

According to one embodiment of the present disclosure, the storage layout is designed such that program ranges having different access characteristics are written to different segments; such that a segment is always filled starting from its virtual start address; such that a first segment is never mapped to the physical address space; such that the at least one program range is allowed to extend over a plurality of segments if the program size exceeds the segment size and program ranges having different access characteristics are simultaneously written to different segments, and a segment is filled starting from its virtual start address.

According to one embodiment of the present disclosure, the step of generating a program is realized by a development system external to the embedded system.

According to one embodiment of the present disclosure, the development system comprises a tool chain which executes the step of generating the program, wherein the tool chain comprises a compiler, an assembler, and a linker.

BRIEF DESCRIPTION OF THE DRAWINGS

The present disclosure is explained in more detail on the basis of the following Figure description. They show.

DETAILED DESCRIPTION

Figure 1:
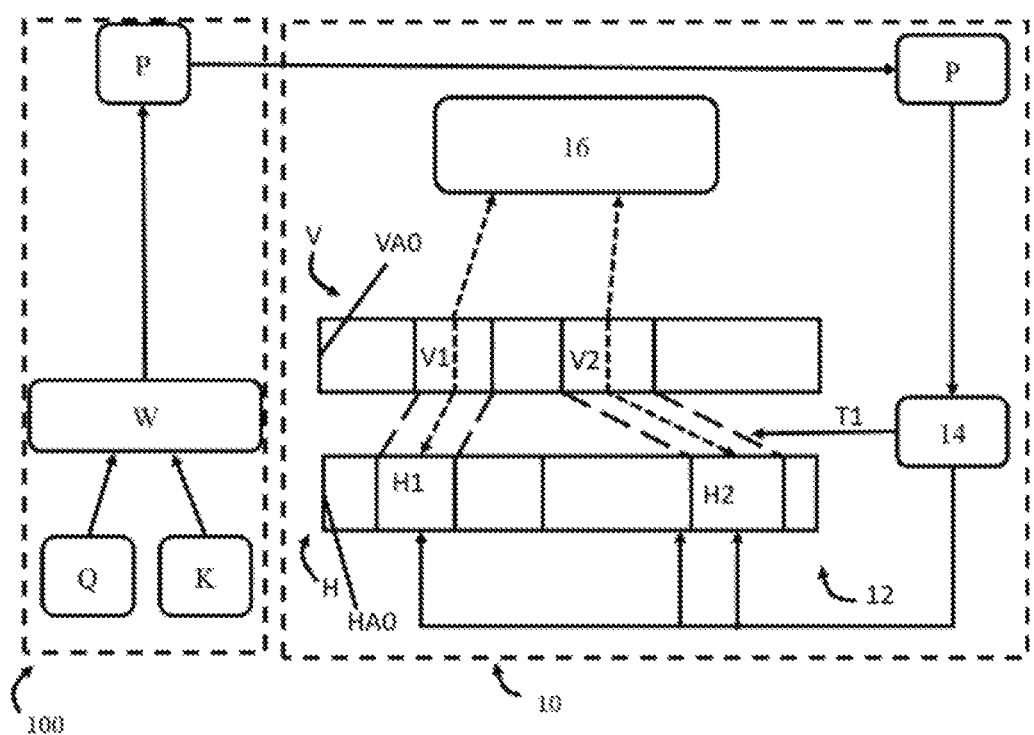
FIG. 1 shows a schematic representation of the method according to the present disclosure for implementing a virtual address space on an embedded system.

FIG. 1 shows a schematic representation of the method according to the present disclosure for implementing a virtual address space V on an embedded system 10.

The overall design of the method, which realizes an efficient implementation of virtual address spaces V, consists of two systems, as represented in FIG. 1 by the dashed lines: the embedded system 10 and a development system 100.

The development system 100 creates a program P suitable for execution on the embedded system 10. The embedded system 10 is configured to receive the program P generated by the development system 100, as represented by the arrow between the systems. The program P may, for example, be transmitted via a USB interface or a radio interface of the embedded system 10 to said system (not shown).

On the development system 100, a source code Q is translated into an executable program P by means of a tool chain W. The tool chain W comprises, for example, a compiler, an assembler, and a linker. In addition to the source code Q, the tool chain W receives a memory configuration K as input (e.g. in the form of a linker script).

The memory configuration K describes that the memory layout L (referring also to FIG. 2) of the program P must correspond to predetermined rules which enable an efficient address conversion from a virtual address V0 to a physical address H0 on the embedded system 10. These predetermined rules will be explained in more detail below.

The program P comprises at least one program range B, for example a first program range B1 which corresponds to the executable code C and, for example, a second program range B2 which corresponds to the data D. Each program range B contains a description of a memory layout L. The program P has a program size G1. The memory layout L contains information about where in the virtual address space V the code C of the program P and the data D of the program P are to be stored. The data D are, for example, initialized or uninitialized global variables of the program P.

Figures 2, 3, 4:
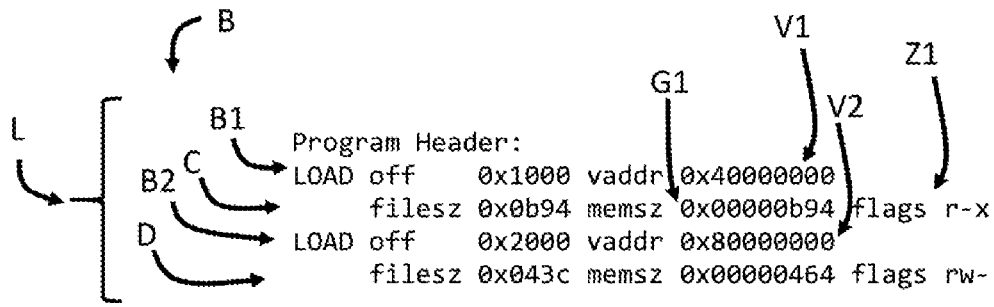
FIG. 2 shows an example of a source code of an executable program.
FIG. 3 shows an executable program generated from the source code shown in FIG. 2.
FIG. 4 shows an exemplary subdivision of the virtual address space into segments.

FIG. 2 shows an example of a source code Q for an executable program P. FIG. 3 shows an executable program P generated from the source code Q shown in FIG. 2.

The program P shown in FIG. 3 indicates, for the memory layout L, that the code C of the program P is 0xb94 bytes in size ("memsz" field of the first line of the "program header" section), is to be loaded to a first virtual address V1 0x40000000 ("vaddr" field of the first line of the "program header" section), and should only be readable and executable, which is represented by the designation "flags r-x".

The data range of the data D stored by the program P is 0x464 bytes in size ("memsz" field of the second row of the "program header" section), is to be loaded to the second virtual address V2 0x80000000 ("vaddr" field of the second row of the "program header" section), and is intended to be readable and writable only, which is represented by the designation "flags rw-". The program P naturally also contains the executable code C, which is indicated by the range introduced by "Disassembly of section .text".

The "flags" designation signals that the following designations identify an access characteristic Z1. The designation r stands for "read", which means readable. The designation w stands for "write", which means writable. The designation x stands for "execute" which means executable. In addition, it is noted that numbers starting with 0x represent a hexadecimal number through the subsequent characters.

The embedded system 10 comprises a physical memory 12, a loader 14, and an execution unit 16.

On the embedded system 10, the loader 14 prepares the program P for execution. The task of the loader 14 is to copy code C and data D from the program P into the physical memory 12 of the embedded system 10. In this instance, the physical addresses H0 do not normally coincide with the virtual addresses V0 of the memory layout L of the program P. Instead, the loader 14 creates a mapping of the virtual addresses V0 to physical addresses H0. For this purpose, the loader 14 must identify unallocated, sufficiently large memory ranges in the physical main memory onto which the virtual addresses can be mapped. The design of this mapping data structure will be described later. If the memory layout L of the program P does not allow an efficient mapping of virtual addresses V0 to physical addresses H0, the loader 14 terminates with an error.

After completion of the loading process, an execution unit 16 (e.g. in the form of an interpreter) can execute the program P. Memory accesses to virtual addresses V0 are converted to physical addresses H0 with the aid of the established mapping. If the execution unit 16 is an interpreter, the interpreter can convert memory accesses accordingly.

Figure 7:
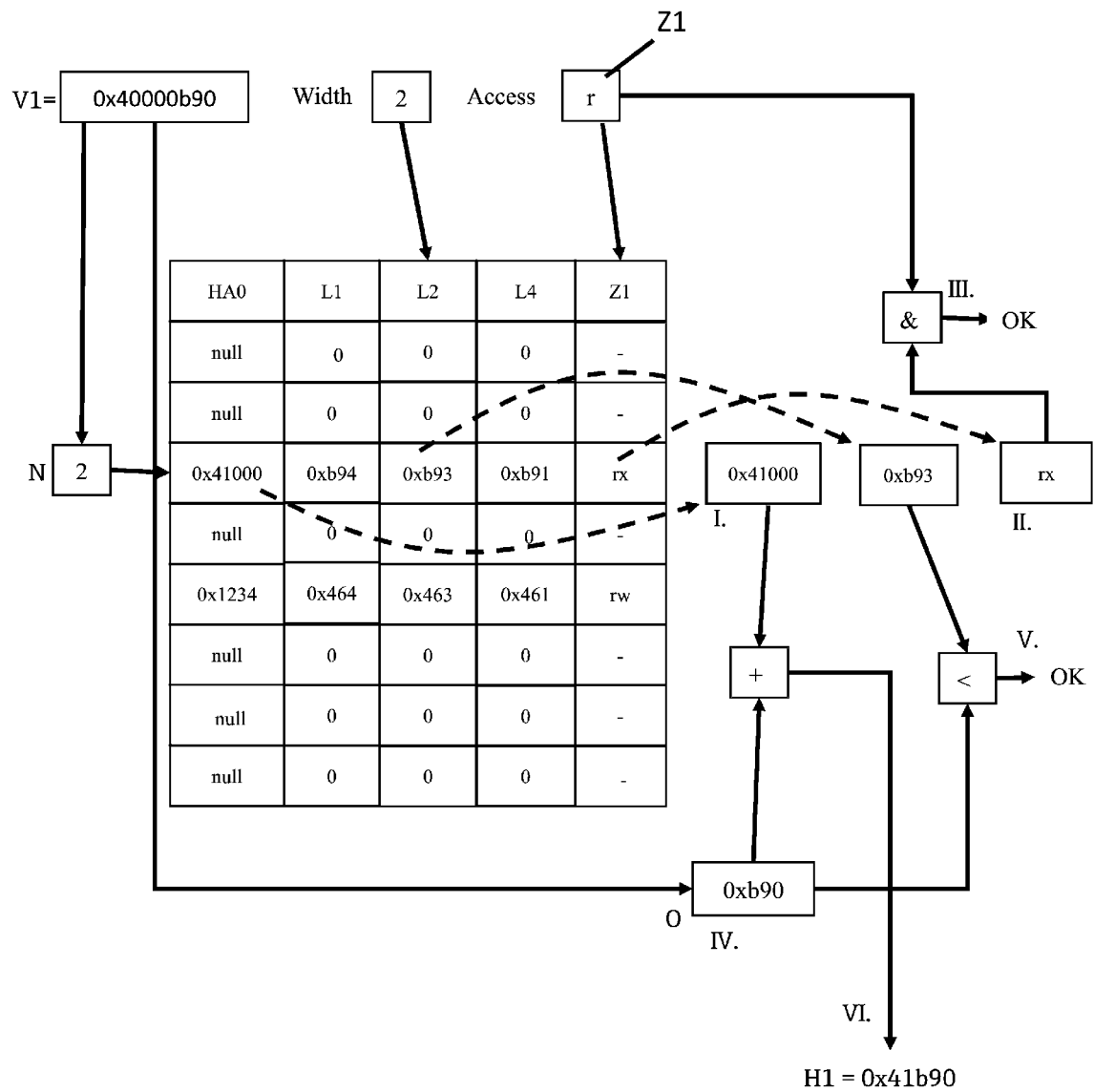
FIG. 7 shows an example of a successful conversion of a virtual address into a physical address.
Figure 8:
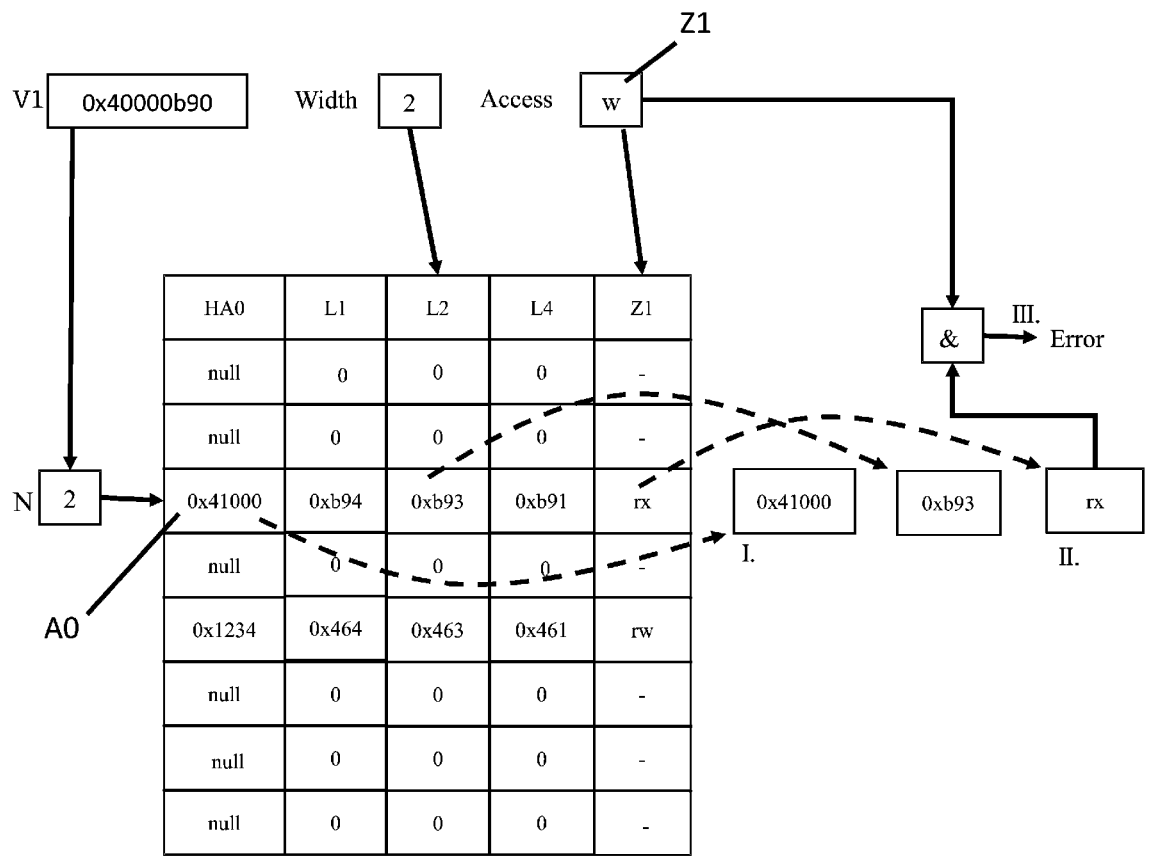
FIG. 8 shows an example of an erroneous conversion of a virtual address into a physical address.
Figure 9:
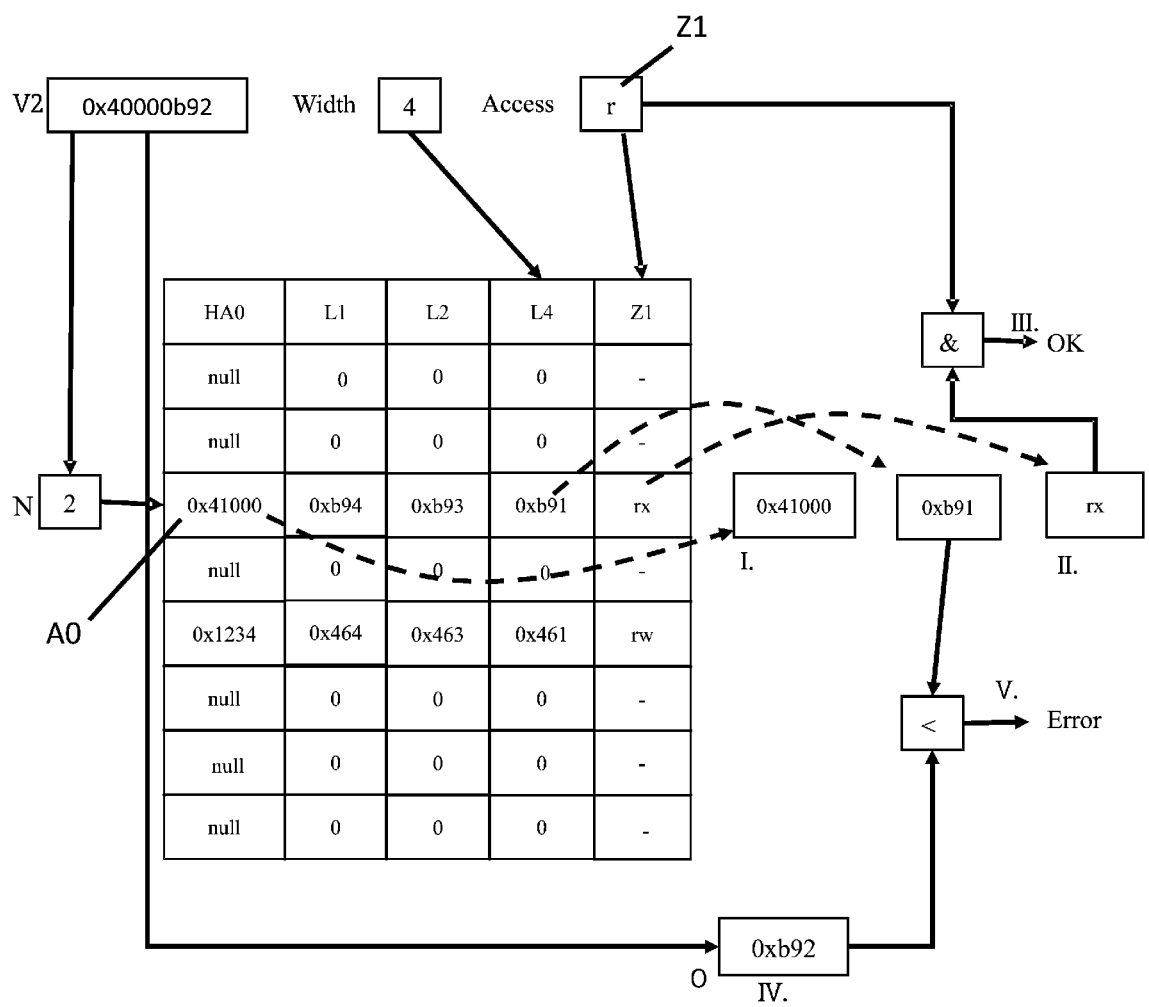
FIG. 9 shows a further example of an erroneous conversion of a virtual address into a physical address.

Another alternative is that the execution unit 16 corresponds to the main processor of the embedded system 10, which executes the program P directly, but the compiler of the tool chain W translates the program P from the source code Q in such a way that the program P first performs an address conversion before each memory access; see FIGS. 7 to 9.

The memory access that is actually performed then takes place via physical addresses H0. In FIG. 1, this is indicated by means of the continuous dashed double arrows between execution unit 16 and code C at the first virtual address V1 and data D at the second virtual address V2 in the virtual address space V, and the code C at the first physical address H1 and the data D at the second physical address H2 in the physical address space H.

In order to enable an efficient mapping, the virtual address space V is divided into a small number of equally sized segments S, wherein the number is a power of two. FIG. 4 shows an example of a 32-bit virtual address space V subdivided into eight segments S of 512 MB each.

The memory layout L of a program P must now fulfill the following boundary conditions or rules:

Firstly, program ranges B of the program P with different access characteristics Z1 must be placed in different segments S. For example, it is not permitted that a read-only code range of the code C and a readable and writable data range of the data D are placed one after the other in a segment S.

Secondly, a segment S must always be filled starting from its virtual start address VA0. For example, a range lying in a third segment S2 of a 32-bit virtual address space V with eight segments of 512 MB each must therefore begin at address 0x40000000.

Thirdly, a first segment S0 is never mapped to the physical memory 12. Thus, zero pointer accesses can be intercepted.

Fourthly, a program range B of a program P may also extend over a plurality of segments S as long as the aforementioned three boundary conditions or rules are satisfied.

These boundary conditions or rules do not represent practical limitations of the program P within the embedded system 10 that is employed. In a resource-restricted embedded system 10, the total available physical memory 12 is substantially smaller than the size of a segment S, and the number of memory ranges of a program P is small (code, data, stack, heap). A segmented virtual address space V with the boundary conditions described above therefore still offers sufficient placement possibilities for the individual program ranges B without the risk of the segments S not being sufficient.

Figures 5, 6:
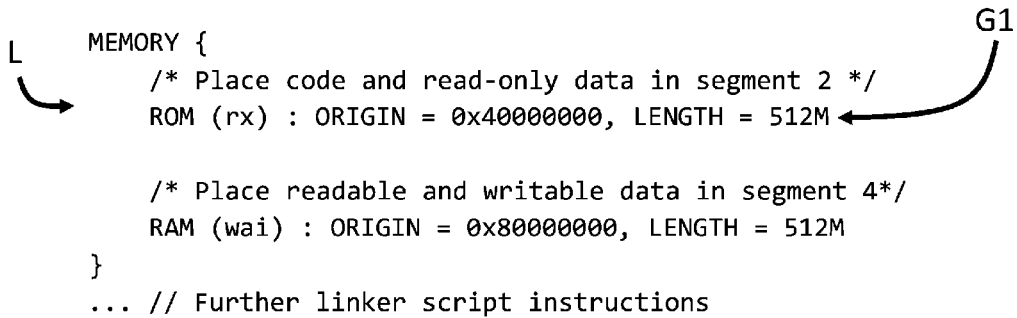
FIG. 5 shows an exemplary configuration of a memory layout of the executable program from FIG. 3.
FIG. 6 shows an exemplary embodiment of a conversion table.

FIG. 5 shows an exemplary configuration K of a memory layout L which, for the source code Q of the program P, forces code C and read-only data D to be placed in the third segment S2, readable and writable data D in a fourth segment S4.

The example shown in FIG. 5 is a linker script of the GNU linker software. This linker allows program ranges B of the program P with certain access characteristics Z1 to be placed at different virtual addresses V0, which was done in the shown example.

FIG. 6 shows a conversion table T1 for mapping virtual address V0 to physical address H0 which, by way of example, was filled by the loader 14 with addresses matching the program P from FIG. 3.

The aim of the conversion table T1 is to restrict the mapping rules of virtual addresses V0 to physical addresses H0 in such a way that an efficient conversion of virtual addresses V0 to physical addresses H0 is possible, but nevertheless all use cases that are usable on an embedded system 10 can still be represented by a virtual address space V. In addition, a memory-efficient data structure for the mapping rule is enabled. The programs P that are executed on the embedded system 10 must have the memory layout L, which corresponds to the limitations, i.e. the aforementioned rules, of the virtual address space V.

The conversion table T1 has a plurality of rows and columns, wherein the rows correspond to the segments S of the virtual address space V. The number of rows in the conversion table T1 is thus identical to the number of segments S into which the virtual address space V has been divided. Each line belonging to a segment S has a physical address H0, a plurality of fields indicating the length of the memory range, and an access characteristic Z1. FIG. 6 shows an exemplary conversion table T1 for the program P from FIG. 3. The column of the segment S in FIG. 6 serves only as an annotation for the reader to more easily recognize which line belongs to which segment. The column of the segment S is not part of the conversion table, which is why this is not shown in FIGS. 7 to 9.

The first column contains the physical start address HA0 to which the segment S has been mapped. The second column through the fourth column contain the length of the memory range. The fifth column contains the access characteristic Z1 as a bitmap (one bit each for the readable, writable, executable attributes).

Memory accesses have different access widths, e.g. one byte, two bytes, or four bytes. The conversion table T1 includes a length field per possible access width. Length i, thus length one L1, length two L2, and length four L4 in FIG. 6, indicates below which segment offset a virtual address V0 must lie in order for an access of width i to remain within the mapped memory range.

For the address conversion of a virtual address V0, the following steps are performed by the execution unit 16 upon a memory access: the first virtual address V1 is split into a segment number N and a segment offset O. Since the number n of segments S is a power of two, the high-order log2 form the segment number N n bits from the first virtual address V1. The remaining bits yield the segment offset O.

FIGS. 7 and 8 show an example of a conversion in six steps I to VI of a first virtual address V1=0x40000b90 into a first physical address H1=0x41b90. In the example, this is a 32-bit virtual address space with eight segments.

In a first step I, the segment S which is assigned to the first virtual address V1 and its physical start address HA0 are determined. To this end, the first virtual address V1 is examined. Given eight segments, the highest-order three bits of the 32-bit hexadecimal number 0x40000b90 form the segment number N=2, which indicates the row of the third segment S2 of the conversion table T1. The remaining low-order 32−3=29 bits of the hexadecimal number 0x40000b90 form the segment offset O=0xb90. The line of the conversion table T1 corresponding to the segment number N is then used for the address conversion. The first column of the conversion table T1 indicates the physical start address HA0.

In a second step II, the access characteristic Z1 of the previously identified line, namely the third segment S2, is determined. As shown in FIG. 7, this allows reading "r" and execution "x".

In a third step III, the access characteristic Z1 of the previously identified line, namely the third segment S2, is compared with the access characteristic Z1 of the memory access to the first virtual address V1. The access characteristic Z1 of the third segment S2 must allow the corresponding type of memory access (e.g. read "r", write "w", or execute "x"). Otherwise, the conversion fails.

FIG. 8 shows an example of a failed conversion. There, the access characteristic Z1 of the memory access requested writing "w" to the first virtual address V1. However, the access characteristic Z1 of the previously identified line, namely of the third segment S2, allowed only reading "r" or execution "x". In this instance, the length check and the address conversion per se are no longer necessary. The address conversion fails, as a result of which the program P is not allowed to perform the memory access and is thus terminated with an error, for example.

If the access is permitted, as shown in FIG. 7 for a two-byte read access, then the segment offset O is determined in a fourth step IV by extracting the low-order bits from the first virtual address V1. Subsequently, in a fifth step V the determined segment offset O is compared with the length field L1, L2, L4 corresponding to the access width.

If the segment offset O is below the value in the length field L1, L2, L4, the first virtual address V1 can be converted. In this instance, in a sixth step VI the first physical address H1 is specified. In the example of FIG. 7, this is H1=0x41b90.

The conversion from the first virtual address V1 to a corresponding first physical address H1 takes place by adding the segment offset O to the physical start address HA0 stored in the entry of the segment number N. The individual steps of the conversion are efficient, since they can be realized with a constant runtime requirement.

In the event that the segment offset O is not below the value in the length field L1, L2, L4, the program P is terminated. FIG. 9 shows a termination at step V due to an attempted access outside the memory range. The segment S, belonging to the second virtual address V2=0x40000b92, is 0xb94 bytes long in total. This means that the virtual address range valid for this segment is within the interval [0x40000000, 0x40000b93]. However, the four-byte access in the example would try to load the four bytes from the addresses 0x40000b92, 0x40000b93, 0x40000b94, and 0x4000b95. However, the last two addresses are outside the range. This is established by the length comparison in step V, which leads to an error and thus terminates the conversion (and thus the program). In this instance, the address conversion is no longer necessary.

The present disclosure enables an efficient conversion of virtual addresses V0 to physical addresses H0 on an embedded system 10 without MMU. Due to the design of the conversion table T1, an address conversion from a virtual address V0 to a physical address H0 is possible in a uniform amount of time.

The invention claimed is:

1. A method for implementing a virtual address space, comprising the steps of:
providing an embedded system having a physical memory, a loader, and an execution unit, wherein the physical memory defines a physical address space;
providing a program, wherein the program is executable by the embedded system, the program including at least one program range having a respective access characteristic and including a predetermined memory layout for the virtual address space, wherein the at least one program range is assigned to a virtual address in the virtual address space and has a program size;
creating, by the loader, the virtual address space on the embedded system, which comprises at least two segments respectively having an identical segment size and respectively having a separate virtual start address, thereof a first segment and a second segment;
creating, by the loader, a conversion table on the embedded system for the program, the conversion table configured for converting a virtual address of the at least one program range into a physical address in the physical memory; and
converting a memory access to the virtual address into the physical address using the conversion table via the execution unit or the program,
wherein the memory layout is configured such that:
program ranges having different access characteristics are written into different segments;
each segment of the least two segments is always filled starting from its virtual start address; and
the first segment is never mapped to the physical address space, and
wherein the at least one program range extends over a plurality of segments when the program size exceeds the segment size as long as program ranges having different access characteristics are simultaneously written to different segments and as long as a segment of the at least two segments is filled starting from its respective virtual start address.

2. The method of claim 1, wherein the virtual address space is subdivided into a number of segments, wherein the number is a power of two.

3. The method of claim 1, wherein the access characteristic of the at least one program range includes at least one of read access, write access and execute access.

4. The method of claim 1, wherein the at least one program range extends over a plurality of segments further as long as the first segment is not mapped to the physical address space.

5. A method for generating a program for an embedded system based on a source code and a memory configuration, wherein the embedded system includes a physical memory, a loader and an execution unit, wherein the physical memory defines a physical address space, the method comprising:
translating the source code into a program executable on the embedded system, the program including at least one program range having a respective access characteristic and including a memory layout for a virtual address space as defined by the memory configuration,
wherein the at least one program range is assigned to a virtual address in the virtual address space and has a program size,
wherein the virtual address space includes at least two segments of an identical segment size and each having a separate, respective virtual start address,
wherein the memory layout is configured such that:
program ranges of the at least one program range having different access characteristics are written into different segments of the least two segments;
each segment of the least two segments is always filled starting from its respective virtual start address; and
a first segment of the least two segments is never mapped to the physical address space, and wherein the at least one program range extends over a plurality of segments when the program size exceeds the segment size as long as program ranges having different access characteristics are simultaneously written to different segments and as long as a segment of the at least two segments is filled starting from its respective virtual start address.

6. The method of claim 5, wherein the method is performed by a development system external to the embedded system.

7. The method of claim 6, wherein the development system comprises a tool chain which executes the method of generating the program, wherein the tool chain comprises a compiler, an assembler, and a linker.

8. The method of claim 5, wherein the access characteristic of the at least one program range includes at least one of read access, write access and execute access.

9. The method of claim 5, wherein the at least one program range extends over a plurality of segments further as long as the first segment is not mapped to the physical address space.

* * * * *